Jan. 6, 1953     S. H. LAMPORT     2,624,391
WELDING HEAD

Filed Sept. 25, 1951     3 Sheets-Sheet 1

INVENTOR
SAMUEL H. LAMPORT,
BY
*Irving Seidman*
ATTORNEY

Jan. 6, 1953  S. H. LAMPORT  2,624,391
WELDING HEAD
Filed Sept. 25, 1951  3 Sheets-Sheet 2
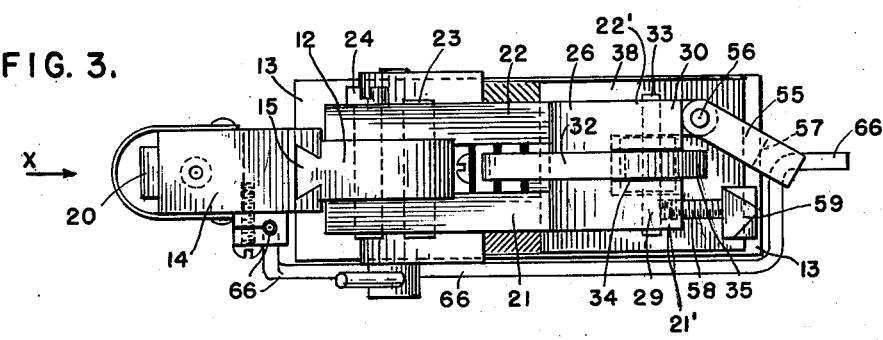
FIG. 3.
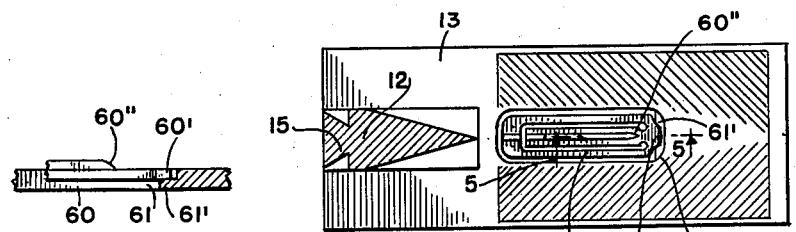
FIG. 5.
FIG. 4.
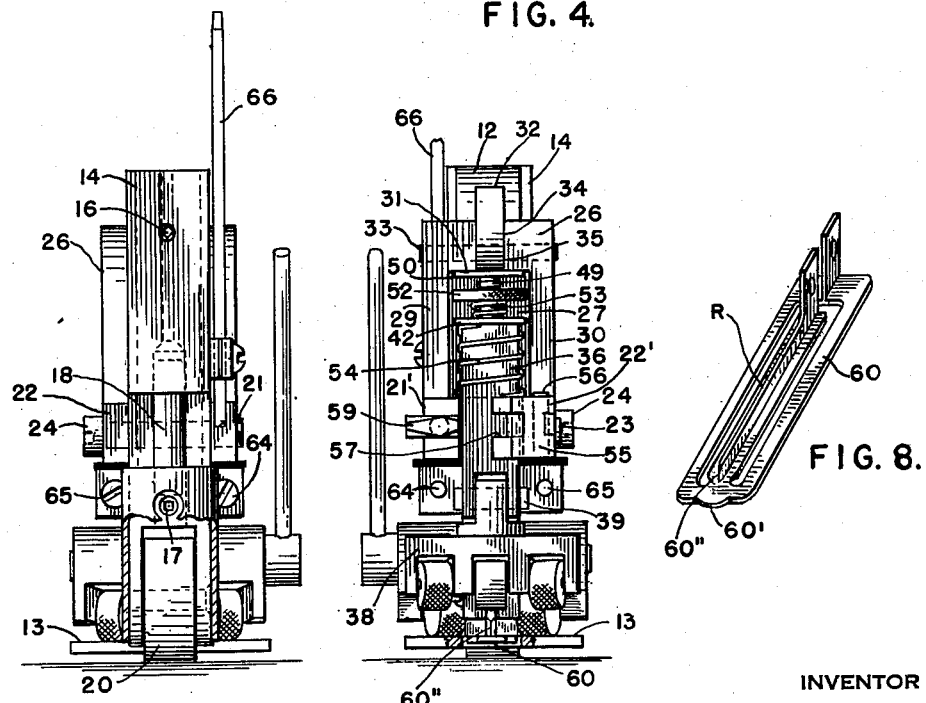
FIG. 6.  FIG. 7.  FIG. 8.
INVENTOR
SAMUEL H. LAMPORT,
BY
ATTORNEY Jan. 6, 1953 S. H. LAMPORT 2,624,391
WELDING HEAD Filed Sept. 25, 1951 3 Sheets-Sheet 3

INVENTOR
SAMUEL H. LAMPORT,
BY
Irving Seidman
ATTORNEY

Patented Jan. 6, 1953

2,624,391

UNITED STATES PATENT OFFICE 2,624,391

WELDING HEAD

Samuel H. Lamport, Southbridge, Mass., assignor to Golding Bros. Company, Inc., New York, N. Y., a corporation Application September 25, 1951, Serial No. 248,247

3 Claims. (Cl. 154—42)

This invention relates to an attachment for a welding head which forms a part of a machine for seaming plastic material and has particular reference to an improved roller block standard or carrier employed in said machine.

The improved roller block standard which comprises the subject matter of this application is in the nature of an improvement of the roller block standard upon a machine for seaming plastic materials outlined in application Ser. No. 98,902, filed June 14, 1949, now Patent No. 2,556,476.

An object of this invention is to provide a roller block standard which comprises a minimum number of parts which are readily disassembled for replacement or repairs.

A further object of this invention is the inclusion therein of a simple means for holding the parts in operative assembly under a spring locking means engageable around a plunger member and held within a roller block standard.

A further object of this invention is the provision therein of threaded means for adjusting the said compression spring.

A still further object of this invention is the provision of an organization in which the constituent elements are so arranged structurally and functionally as to assure improved results with materials and members which may be manufactured at reasonable cost, may be easily assembled and which will be efficient in operation with minimum wear to the parts.

The best embodiment of the invention has been chosen for illustrative purposes, but this embodiment should be viewed as being illustrative only and not as limiting because obviously the invention is capable of other embodiments having revised details of construction, so long as they fall within the ambit of the appended claims.

The invention itself, however, both as to its organization and its method of operation, will best be understood from the following description of a specific embodiment when read in connection with the accompanying drawings, in which:

Fig. 3 is a top or plan view of same.

Fig. 4 is a plan view of the base plate of the welding head and shows a portion of same in section (the section being taken substantially along line 4—4 of Fig. 1).

Fig. 5 is a fragmentary sectional detail taken along line 5—5 of Fig. 4.

Fig. 6 is an elevational view of the leading end of the welding head, looking in the direction indicated by the arrow X in Fig. 3 and has a part broken away.

Fig. 7 is an elevational view of the opposite end of the welding head, with parts broken away.

Fig. 8 is a perspective detail of a part of the welding head.

Figure 1:
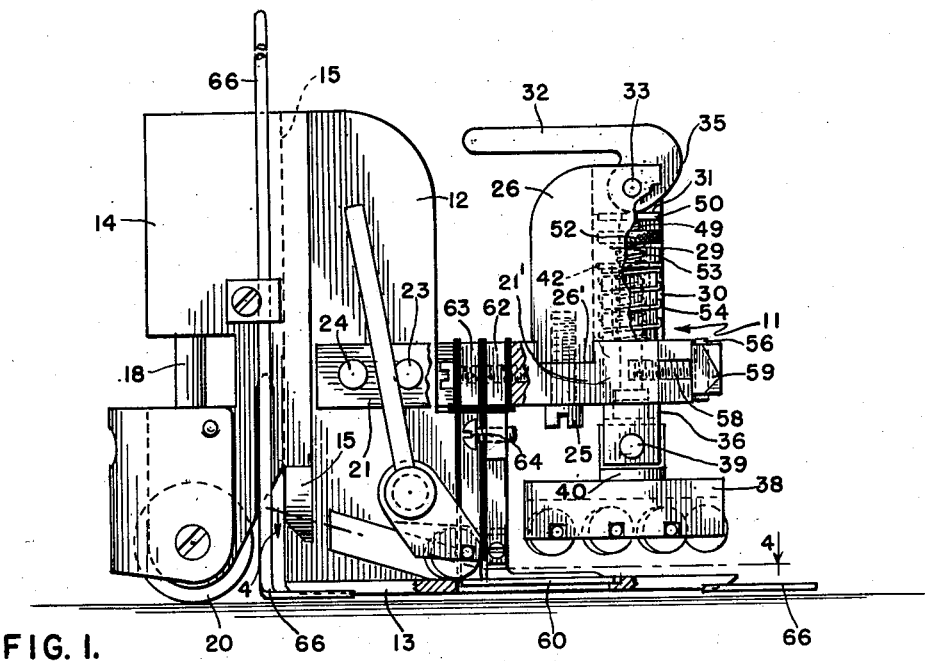
Fig. 1 is a side elevational view of a welding head having an improved roller block standard attached thereto, and has parts broken away.

Referring in detail to the parts, 11 designates, generally, a welding head comprising an upright member 12 which is supported upon and attached to a base plate 13; an upright pivot block 14 adjustable slidable upon the said upright member 12; a dovetail connection 15 between the said upright member 12 and said upright pivot block 14; set screws 16 and 17, engageable through the said upright pivot block 14 and contacting the dovetail end formed upon said upright member 12, are adapted to lock the upright pivot block 14 in fixed position upon the upright member 12. A removable pin 18, engageable in bores 19 in the said upright pivot block 14, provides a means for pivotally attaching the apparatus to the seam sealing machine comprising the copending application hereinbefore mentioned. The said set screw 17 is adapted also to hold said pin 18 in position. A leader roller 20 is mounted upon the lower end of said upright pivot block 14. An H shaped block having long leg formations 21 and 22 extending to and embracing the sides of the upright member 12 is secured thereto by means of a removable pin 23 and a threaded shoulder bolt 24. Short legs 21' and 22' extend from the opposite end of the H shaped block and provide a supporting means for a roller block standard which forms the essential feature of this invention.

Upon the outer free ends of the short legs 21' and 22' there is secured, by means of screws 25 (Figs. 1 and 2) an upright block 26 having a recess or pocket 27 which has a rear wall 28, side walls 29 and 30 and a top 31 (Figs. 1, 2, 3 and 7) and is open along its front and at its lower end. A lever arm 32 is pivoted, by a pin 33, within a slot 34 in the said top 31 and is formed, at its pivoted end with a cam 35. The said pocket 27 partially encloses a roller block standard 36 reciprocally movable in said pocket and having a slotted lower end 37 which engages and supports a roller block 38. A knee pin 39, engaging through the said slotted end of the roller block standard and knee stud 40, upstanding from the said roller block 38, pivotally holds said roller block 38 to the said roller block standard.

The H-shaped block is formed with a slot 26' (Fig. 2) which is milled across that part which forms the cross member of the H-shaped block and the said upright block 26 is held therein by the screws 25. The roller block standard 36 is supported and aligned by the opening or slot formed between the said short legs 21' and 22' of the H-shaped member.

A bore 41 (Fig. 9) extends downwardly, part way into the roller block standard 36 and a squared cap plate 42 having its edges slightly overlapping the sides of the roller block standard 36 to form a shoulder 42' is secured to the top of the said roller block standard. An orifice 43 coinciding with the bore 41, is formed in the said squared cap plate 42. A second bore 44, aligned with the bore 41, extends upwardly, part way, from the slotted end 37 and is aligned with the bore 41. The two said bores are connected by a channel 45, concentrically therewith. Through the said channel 45 there extends, upwardly, a rod 46, having a broadened head 47 engageable against the shoulder 48 formed between the channel 45 and bore 44. The said rod 46 passes through the bore 41 and extends upwardly beyond the plate 42 at the top of the roller block standard 36, has a threaded portion 49 and is capped with a removable square plate 50 which engages over a square shank 51 upon the upper end of the rod 46. A thumb nut 52 having an internally threaded bore engages over the threaded portion 49 of the rod 46 and is adjustable thereon. A helical spring 53 engages around the rod 46 and is disposed between the bottom of the bore 41 and the under side of the thumb nut 52. A compression spring 54, contoured to embrace the said roller block standard 36 fits loosely around same and contacts, at one end, against the shoulder 42' while the opposite or lower end of spring 54 contacts the top of the aforementioned bracket bars at the outer free ends thereof, best shown in Fig. 7.

Figure 9:
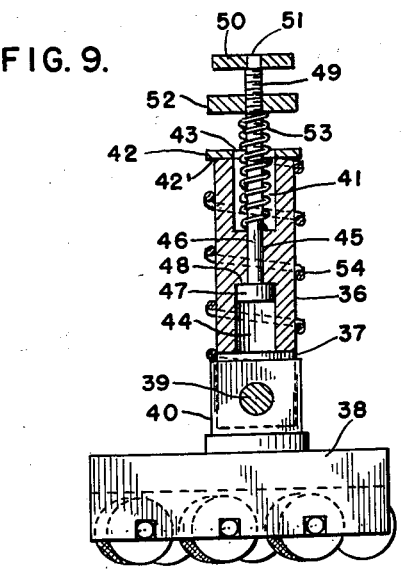
Fig. 9 is an elevational view, partly in section, of the improved roller block standard or carrier.
Figure 10:
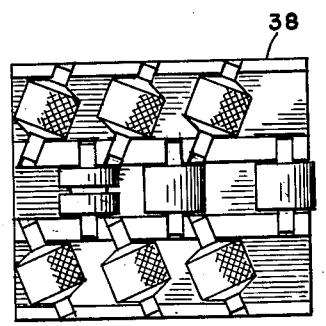
Fig. 10 is a plan view of the bottom of a roller block attached to the said standard.
Figure 11:
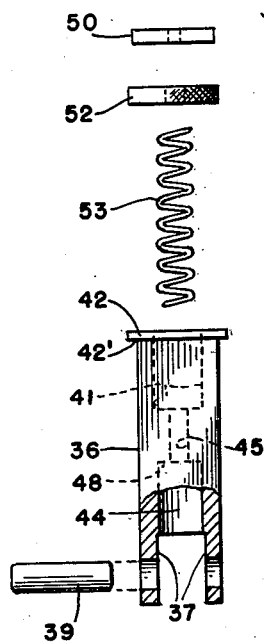
Fig. 11 is an exploded view of the roller block standard.

The parts are easily disassembled by withdrawing the knee pin 39 to remove the roller block 38. Proceeding then as follows, the square shaped plate 50 is removed from the rod 46, the thumb nut 52 is unscrewed and removed, the spring 54 slipped off the rod which is then removed and the spring 54 removed from the standard 36. The parts may then be arranged as shown in Fig. 11. To reassemble the reverse order is followed until all the parts are again together as illustrated in Fig. 9.

Figure 2:
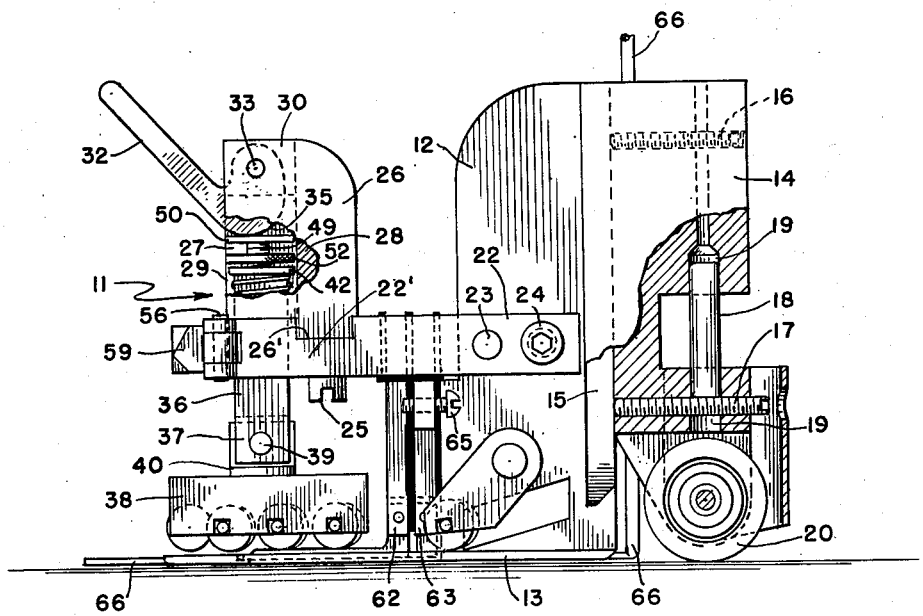
Fig. 2 is an elevational view of the opposite side of same, having parts broken away.

When the parts are thus assembled the roller block standard 36 is placed in position upon the free ends of the short legs 21' and 22' of the H-shaped block, it being necessary to compress spring 54 so that its lower end will rest upon the upper surface of the ends of the said bracket bars. The pressure of the spring 54, which is now disposed between the shoulder 42' of the plate 42 and the said short legs 21' and 22', will hold the roller block standard in place within the recess or pocket 27. To properly align the roller block standard and prevent the dislodgment of the said roller block standard, there is provided a gate member 55 hinged at one end, by a pin 56, to the free end of the bracket bar 22 (Figs. 1, 2, 3 and 7). The opposite or free end of the gate member 55 is formed with a slot 57 which is adapted to engage a locking bolt 58 which is in turn threaded into the free end of the bracket bar 21 as best shown in Figs. 1 and 2. A hand or finger hold 59 is formed upon the locking bolt 58 to turn the locking nut when required.

As shown in Fig. 1, the lever arm 32 is turned to bring the roller block 38 into its raised position but by turning the said lever arm 32 to the position shown in Fig. 2 the cam is forced downwardly to its lowered position, the cam end 35 acting against the plate 50 drives the plunger 46 and the thumb nut 56 down against the helical spring 53, which in turn transmits the downward motion through the bottom shoulder of the bore 41, to the roller block standard 36, to the knee pin 39, to the roller block stud 40, and finally to the roller block 38. When in operation, the material being welded or fused together is disposed between the rollers in the roller block and the foot plate 13 and the spring transmitted downward motion is absorbed and counterbalanced by the cantilever spring action of the foot plate 13, which results in a spring loaded force action between the roller block and the foot plate at all times. The downward spring action force exerted by the roller block 38 can be adjusted by changing the compressed length of the helical spring 53 by screwing the thumb nut 52 up or down on the threaded portion 49 of the plunger 46. The square plate 50 holds the rod 46 against rotation within the pocket 27 when the thumb nut 52 is turned for adjustment.

The pin 18, heretofore described, provides a means for attaching the complete heater head shown, to a seam-sealing machine of the type mentioned in the patent application heretofore mentioned and which includes a heater element 60 held in an elongated opening 61 (Fig. 4) and mounted upon depending blocks 62 and 63 (Figs. 1 and 2) which are in turn, connected at 64 and 65 to electric current conductors (not shown). A feed and distributor tube 66 is connected by a flexible tube leading from a reservoir upon the aforementioned seam-sealing machine and not shown inasmuch as same does not form a part of this invention.

The heater unit 60 above mentioned, is formed with a lip 60' which is adapted to engage and rest upon a shoulder 61' formed in the opening 61. The said lip and ledge is employed to prevent the edge of the said heater unit dropping below the base plate 13. The following edge 60" of the upright rib R upon the heater unit may be formed with a tapered or knife edge (Figs. 4, 7 and 8).

I claim:

1. The combination in a welding head for a machine for seaming plastic material, of an attachment comprising a housing secured upon an H-shaped block of said welding head, a roller block standard reciprocally movable within said housing and projecting downwardly through said housing, a roller block pivotally attached to the lower end of said roller block standard, the roller block standard having an upper and lower bore and a channel connecting the two said bores, a plunger slidable engaging through said bores and channel, the said plunger having a head upon one end engageable against the top portion of the said lower bore, a threaded upper portion and a square shank upon its uppermost end, a square shaped plate upon the said square shaped shank, a plate having an orifice, coinciding with the said upper bore, secured to the upper end of the roller block standard and over-lapping same, a spring engaging around the said roller block standard and disposed between the said overlapping orificed plate and said H-shaped block of the heater head and adapted to urge the said roller block standard upwardly when same is mounted upon the welding head, a helical spring within the said upper bore engageable around the said plunger and a thumb nut threaded upon the said plunger and rotatable thereon, the said helical spring being disposed between the said thumb nut and the floor of the said upper bore.

2. The combination in a welding head for a machine for seaming plastic material as defined in claim 1, including a gate pivotally attached to the end of a bracket of the heater head and locking means upon the end of a second bracket of the heater head affording means for locking the said roller block standard in the welding head and aligning it with same.

3. The combination in a welding machine for seaming plastic material as defined in claim 1, including a knee-pin and roller block stud to connect the said roller block to the roller block standard and in which the said helical spring transmits a downward motion to the roller block standard, to the knee pin, the roller block standard and roller block, and a foot plate upon the welding head adapted, by its cantilever spring action to absorb and counterbalance the transmitted downward motion of said spring, resulting in a spring loaded force action between the roller block and foot plate at all times.

SAMUEL H. LAMPORT.

REFERENCES CITED

The following references are of record in the file of this patent:

UNITED STATES PATENTS

| Number | Name | Date |
| --- | --- | --- |
| 1,543,843 | Gwinn | June 30, 1925 |
| 1,628,203 | Stein | May 10, 1927 |
| 2,107,249 | Hepke | Feb. 1, 1938 |
| 2,343,975 | Hosfield | Mar. 14, 1944 |
| 2,451,728 | Gardner et al. | Oct. 19, 1948 |